(12) United States Patent
Huang et al.

(10) Patent No.: US 10,067,605 B2
(45) Date of Patent: Sep. 4, 2018

(54) DRIVING METHOD FOR REDUCING DISPLAY INTERFERENCE IN IN-CELL MULTI-TOUCH PANEL AND SYSTEM USING THE SAME

(71) Applicant: Orise Technology Co., Ltd., Hsinchu (TW)

(72) Inventors: Hsin-Mao Huang, Hsinchu (TW); Pei-Chang Ho, Hsinchu (TW); Szu-Mien Wang, Hsinchu (TW)

(73) Assignee: FOCALTECH SYSTEMS CO., LTD., Hsinchu (TW)

(*) Notice: Subject to any disclaimer, the term of this patent is extended or adjusted under 35 U.S.C. 154(b) by 114 days.

(21) Appl. No.: 14/246,897

(22) Filed: Apr. 7, 2014

(65) Prior Publication Data
US 2014/0306906 A1 Oct. 16, 2014

(30) Foreign Application Priority Data
Apr. 10, 2013 (TW) .............................. 102112654 A

(51) Int. Cl.
*G06F 3/045* (2006.01)
*G06F 3/044* (2006.01)
*G06F 3/041* (2006.01)

(52) U.S. Cl.
CPC ............ *G06F 3/0418* (2013.01); *G06F 3/044* (2013.01); *G06F 3/045* (2013.01); *G06F 3/0412* (2013.01)

(58) Field of Classification Search
CPC .......... G09G 3/22; G09G 3/3208; G09G 3/30; G09G 3/3225; G09G 3/3233; G09G 3/3241; G09G 3/3266; G09G 3/3275; G09G 3/3258; G09G 3/041; G09G 3/044; G09G 3/045
See application file for complete search history.

(56) References Cited

U.S. PATENT DOCUMENTS

| | | | | |
|---|---|---|---|---|
| 9,354,741 B2* | 5/2016 | Uchida | ................ | G06F 3/0416 |
| 9,372,584 B2* | 6/2016 | Shepelev | ................ | G06F 3/044 |
| 9,823,768 B2* | 11/2017 | Chang | ................... | G06F 3/0416 |
| 2010/0253638 A1* | 10/2010 | Yousefpor et al. | ........... | 345/173 |
| 2010/0302202 A1* | 12/2010 | Takeuchi et al. | .............. | 345/174 |
| 2011/0187677 A1* | 8/2011 | Hotelling | .............. | G06F 3/0412 |
| | | | | 345/174 |
| 2011/0254802 A1* | 10/2011 | Philipp | ........................ | 345/174 |
| 2012/0113045 A1* | 5/2012 | Lai | ................ | 345/174 |
| 2013/0335338 A1* | 12/2013 | Lai | .......................... | G06F 3/044 |
| | | | | 345/173 |
| 2014/0354590 A1* | 12/2014 | Wang | ..................... | G06F 3/044 |
| | | | | 345/174 |

* cited by examiner

*Primary Examiner* — William Lu
(74) *Attorney, Agent, or Firm* — Bacon & Thomas, PLLC

(57) ABSTRACT

In a driving method for reducing display interference in in-cell multi-touch panel, a display driving signal is provided to K gate lines and a display image signal is provided to L source lines so as to drive corresponding transistors and capacitors in a display frame for displaying an image. The method also provides a touch driving signal to N touch driving lines and receives touch signals from M sensing lines to thereby detect one or more touch point positions of an external object in a touch frame based on the touch driving signal. In each touch frame, a sequence of providing the touch driving signal to N touch driving lines is different.

14 Claims, 9 Drawing Sheets

DRIVING METHOD FOR REDUCING DISPLAY INTERFERENCE IN IN-CELL MULTI-TOUCH PANEL AND SYSTEM USING THE SAME

BACKGROUND OF THE INVENTION

1. Field of the Invention

The present invention relates to the technical field of touch panels and, more particularly, to a driving method for reducing display interference in in-cell multi-touch panel and a system using the same.

2. Description of Related Art

The principle of touch panels is based on different sensing manners to detect a voltage, current, acoustic wave, or infrared to thereby detect the coordinates of touch points on a screen where a finger or other medium touches. For example, a resistive touch panel uses a voltage difference between the upper and lower electrodes to compute the position of a pressed point for detecting the location of the touch point, and a capacitive touch panel uses a capacitance change generated in an electrostatic combination of the arranged transparent electrodes and a human body to generate a current or voltage for detecting touching coordinates.

A typical flat touch display is produced by stacking a touch panel directly over a flat display. Since the stacked touch panel is transparent, the image on the flat display can be displayed by passing through the stacked touch panel, and the touch panel can act as an input medium or interface. However, such a stacking requires an increased weight of the touch panel, resulting in relatively increasing the weight of the flat display, which cannot meet with the compactness requirement for current markets. Thus, when the touch panel and flat display are stacked directly, the increased thickness reduces the transmittance of rays and increases the reflectivity and haziness, resulting in relatively reducing the display quality on the screen.

To overcome this, the embedded touch control technology is adopted. The currently developed embedded touch control technologies are essentially on-cell and in-cell technologies. The on-cell technology uses a projected capacitive touch technology to form sensors on the backside (i.e., a surface for attaching a polarized plate) of a color filter (CF) for being integrated into a color filter structure. The in-cell technology embeds a sensor in LCD cells to thereby integrate a touch element with a display panel such that the display panel itself is provided with a touch function without having to be attached or assembled to a touch panel. The in-cell multi-touch panel technology is getting more and more mature, and since the touch function is directly integrated during a panel production process, without adding a layer of touch glass, the original thickness is maintained and the cost is reduced.

FIG. 1 is a schematic diagram of a typical in-cell multi-touch panel system. As shown in FIG. 1, the panel system is comprised of a display controller 110 and an in-cell multi-touch panel 130. The display controller 110 includes a touch controller 111 and a display driver 113.

The display driver 113 outputs red (R), green (G), and blue (B) pixel signal to the in-cell multi-touch panel 130 for displaying an image. In addition, the touch controller 111 outputs a touch driving signal to the in-cell multi-touch panel 130 through a control signal or a common signal Vcom[1:N]. The in-cell multi-touch panel 130 thus receives a sensing signal Sensing[1:M] for performing a touch detection.

FIGS. 2(A)-2(C) are schematic diagrams of a common voltage layer (Vcom) and a touch driving layer in a typical in-cell multi-touch panel 130. As shown in FIG. 2(A), the touch driving layer (Tx) is arranged at the same layer as the common voltage (corn) layer on displaying. As shown in FIG. 2(B), the touch driving layer (Tx) is arranged separately from the common voltage (corn) layer on displaying, and in this case there is a sensing electrode layer (Rx) disposed between the touch driving layer (Tx) and the common voltage (com) layer. As shown in FIG. 2(C), the touch driving layer (Tx) is arranged separately from the common voltage (com) layer on displaying, and in this case there is a sensing electrode layer Rx disposed above the touch driving layer (Tx).

The touch driving layer (Tx) and the common voltage (com) layer on displaying are designed in FIG. 2(A) to share the same layer of transparent electrical conductor. Such a configuration requires a time sharing scheme in displaying and in touch sensing for using the conductor lines of the common voltage (corn) layer, so as to avoid noise interference and affecting the display quality on touch sensing. However, for maintaining a frame rate at 60 Hz and concurrently using the conductor lines of the common voltage (com) layer on displaying and on touch sensing, the time shared by the displaying and the touch sensing is limited. The prior art applies a special driving timing to concurrently drive displaying and touch sensing. This is done by separating the gate working interval of a display from the touch driving operating interval of a touch sensing, so as to prevent the displaying and the touch sensing from using the conductor lines in the common voltage (com) layer of the same block. As shown in FIGS. 2(B) and 2(C), the touch driving layer (Tx) and the common voltage (com) layer in the in-cell multi-touch panel can be arranged not to share the same conductor layer. Ideally, the cited panel structures and driving methods, as shown in FIGS. 2(A)-2(C), can achieve concurrent displaying and touch sensing without mutual interference for thus normally displaying a frame. However, in practice, the panel structures and driving methods in FIGS. 2(A)-2(C) may cause a coupling effect due to the operation of a touch driving signal on touch sensing, resulting in that the display frame is irregularly disturbed.

Therefore, it is desirable to provide an improved driving method and system to mitigate and/or obviate the aforementioned problems.

SUMMARY OF THE INVENTION

The object of the present invention is to provide a driving method for reducing display interference in in-cell multi-touch panel and a system using the same, which can reduce the interference in the display frame and save the power.

According to a feature of the present invention, there is provided a driving method for reducing display interference in an in-cell multi-touch panel having a thin film transistor (TFT) layer, a sensing electrode layer, and a common voltage and touch driving layer, the TFT layer having K gate lines and L source lines, the sensing electrode layer having M sensing lines, the common voltage and touch driving layer having N touch driving lines, where K, L, N, M are each a positive integer. The driving method comprises: providing a display driving signal to the K gate lines and a display pixel signal to the L source lines so as to drive corresponding transistors and capacitors in a display frame for displaying an image; and providing a touch driving signal to the N touch driving lines and receiving touch signals from the M sensing lines so as to detect touch point positions of an external object in a touch frame, wherein the touch frame and the display frame are synchronous and have the same time width and, in each touch frame, a sequence of providing the touch driving signal to the N touch driving lines is different.

According to another feature of the present invention, there is provided a system for reducing display interference in in-cell multi-touch panel, which comprises: a touch display panel having a thin film transistor (TFT) layer, a sensing electrode layer, and a common voltage and touch driving layer, the TFT layer having K gate lines and L source lines, the sensing electrode layer having M sensing lines to sense an approaching external object based on a touch driving signal, the common voltage and touch driving layer having N touch driving lines to receive a common voltage on displaying and to receive the touch driving signal on touch sensing, where K, L, M and N are each a positive integer and K>N; and a touch display control subsystem having a touch controller and a display driver such that the display driver provides a display driving signal to the K gate lines and a display pixel signal to the L source lines for driving corresponding transistors and capacitors in each display frame for displaying an image, and the touch controller provides a touch driving signal to the N touch driving lines and receives touch signals from the M sensing lines for detecting touch point positions of the approaching external object in a touch frame, wherein a sequence of providing the touch driving signal to the N touch driving lines is different in each touch frame.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
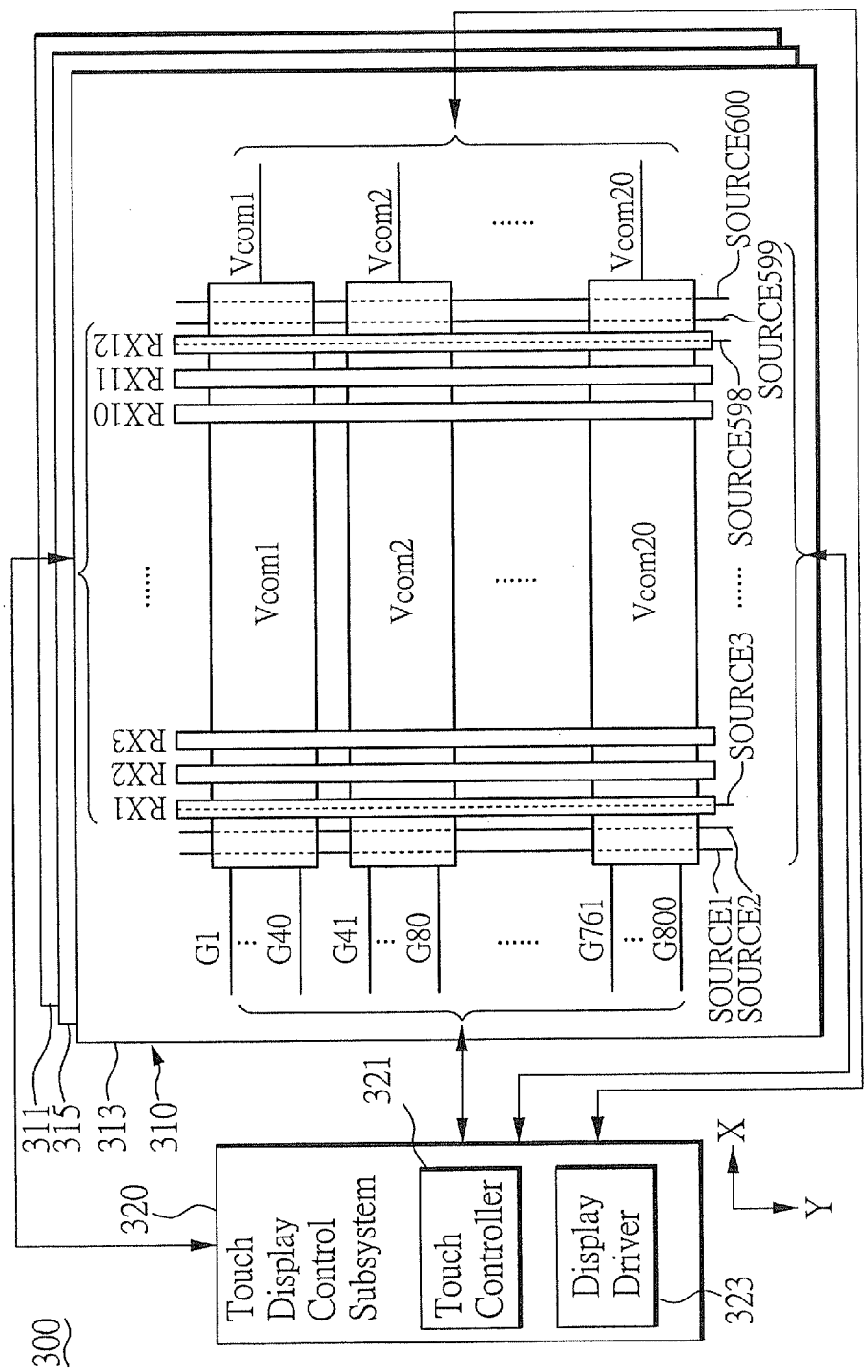
FIG. 3 is a schematic diagram of an application system using a driving method for reducing display interference in in-cell multi-touch panel according to the invention.

FIG. 3 is a schematic diagram of an application system 300 using a driving method for reducing display interference in in-cell multi-touch panel according to the invention. The application system 300 includes a touch display panel 310 and a touch display control subsystem 320.

Figure 1:
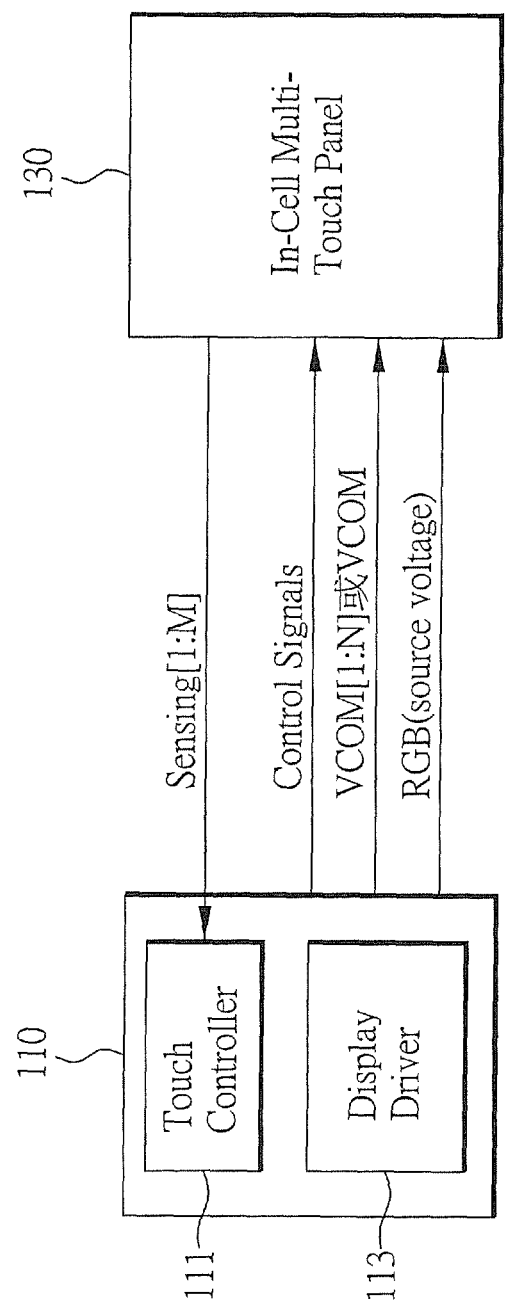
FIG. 1 is a schematic diagram of a typical in-cell multi-touch panel system.
Figure 2A:
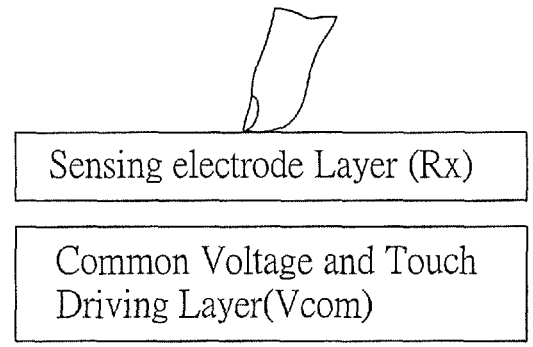
FIGS. 2(A)-2(C) are schematic diagrams of a common voltage layer and a touch driving layer in a typical in-cell multi-touch panel.
Figure 2B:
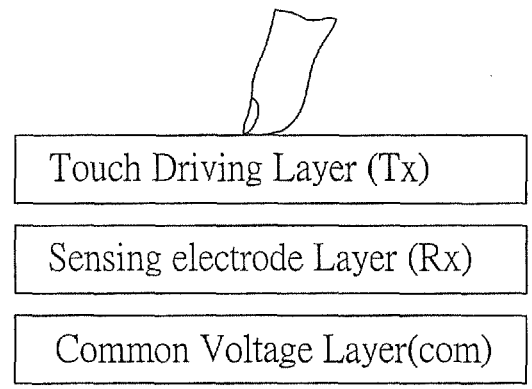
Figure 2C:
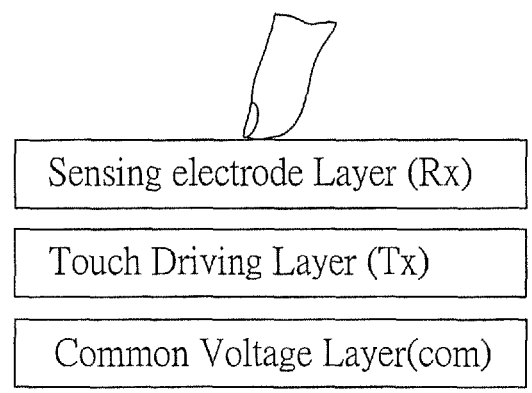

FIG. 3 is the architecture of FIG. 2 (A), i.e., the common voltage (com) layer and the touch driving layer (Tx) share the same transparent conductor layer. In this case, the touch display panel 310 is an in-cell multi-touch panel including a thin film transistor (TFT) layer 311, a sensing electrode layer 313, and a common voltage and touch driving layer (VCOM) 315. However, in other embodiments, the TFT layer 311, the sensing electrode layer 313, and the VCOM layer 315 of the touch display panel 310 can be stacked as one of FIGS. 2(B) and 2(C).

The TFT layer 311 has K gate lines (G1, G2, ..., G800) and L source lines (SOURCE1, SOURCE2, ..., SOURCEL) to drive corresponding transistors DTr and capacitors CLC of the pixels on the touch display panel for displaying an image, where K, L are each a positive integer. For convenient description, K is 800 and L is 600 in this embodiment.

The active component of the TFT layer 311 is TFT in this embodiment. In other embodiments, it can be a low temperature poly-silicon TFT (LTPS TFT), indium gallium zinc oxide TFT (IGZO TFT), or continuous grain silicon (CGS).

The sensing electrode layer 313 has M sensing lines (RX1, RX2, ..., RX12) to sense an approaching external object based on a touch driving signal, where M is a positive integer. In this embodiment, M is 12.

The common voltage and touch driving layer (VCOM) 315 has N touch driving lines (VCOM1, VCOM2, ..., VCOM20) to receive a common voltage (VCOM) on displaying and to receive the touch driving signal on touch sensing, where N is a positive integer and K>N. In this embodiment, N is 20.

The M sensing lines (RX1, RX2, RX12) and the L source driving lines (SOURCE1, SOURCE2, SOURCEL) are disposed on a first direction (Y-axis direction). The K gate driving lines (G1, G2, ..., G800) and the N touch driving lines (VCOM1, VCOM2, ..., VCOM20) are disposed on a second direction (X-axis direction), which is substantially vertical to the first direction.

In this embodiment, the K gate driving lines (G1, G2, ..., G800) are arranged corresponding to the N touch driving lines (VCOM1, VCOM2, ..., VCOM20), That is, the gate driving lines G1-G40 correspond to the first touch driving line VCOM1, the gate driving lines G41-G80 correspond to the second touch driving line VCOM2, and so on. Moreover, the gate driving lines G1-G40 are defined as a first group, the gate driving lines G41-G80 are defined as a second group, ..., and the gate driving lines G761-G800 are defined as a twentieth group. More specifically, the first group of gate driving lines G1-G40 in the TFT layer 311 is located at the same position as the corresponding touch driving line VCOM1 is located in the common voltage and touch driving layer (VCOM) 315, while similar arrangements are applied to the other groups and touch driving lines.

The driving method for reducing display interference in an in-cell multi-touch panel in accordance with the present invention provides a display driving signal to the K gate lines (G1, G2, ..., G800) and a display pixel signal to the L source lines (SOURCE1, SOURCE 2, ..., SOURCEL) in order to drive corresponding transistors and capacitors (not shown) in a display frame for displaying an image, and also provides a touch driving signal to the N touch driving lines (VCOM1, VCOM2, ..., VCOM20) and uses the M sensing lines (RX1, RX2, ..., RX12) to detect an approaching external object in a touch frame based on the touch driving signal, wherein, in each touch frame, the sequence of providing the touch driving signal to the N touch driving lines (VCOM1, VCOM2, . . . , VCOM20) is different.

The touch display control subsystem 320 includes a touch controller 321 and a display driver 323. The display driver 323 provides a display driving signal to the K gate lines (G1, G2, . . . , G800) and a display pixel signal to the L source lines (SOURCE1, SOURCE2, . . . , SOURCEL) for driving corresponding transistors and capacitors in a display frame, so as to display an image. The touch controller 321 provides a touch driving signal to the N touch driving lines (VCOM1, VCOM2, . . . , VCOM20) and uses the M sensing lines (RX1, RX2, . . . , RX12) to sense an approaching external object in a touch frame based on the touch driving signal.

The display driver 323 sequentially scans the K gate lines (G1, G2, . . . , G800) while the touch controller 321 non-sequentially scans the N touch driving lines (VCOM1, VCOM2, . . . , VCOM20) in each touch frame of several successive touch frames, in a premise that the touch driving lines scanned by the touch controller 321 and the gate lines scanned by the display driver 323 are not of the same group, wherein the same group means that the actual location of the scanned touch driving lines overlaps the VCOM location under the scanned gate lines. Since the non-sequential scheme is used in the successive touch frames to provide the touch driving signal to the N touch driving lines (VCOM1, VCOM2, . . . , VCOM20), the frequency of interference generated in the specific gate lines is changed from once every display frame to once every a certain number of display frames. Furthermore, the frame disturbance may be averaged and removed due to the persistence of vision. The order of non-sequentially providing the touch driving signal to the N touch driving lines can be repeated every a few of the touch frames to every a few tens of the touch frames.

In this embodiment, the displaying and the touch sensing may have respective timings or may be synchronized by the same timing. The synchronization of the displaying and the touch sensing indicates that the display frame on displaying and the touch frame on touch sensing are synchronous. Namely, the touch frame and the display frame have the same time width.

Figure 4:
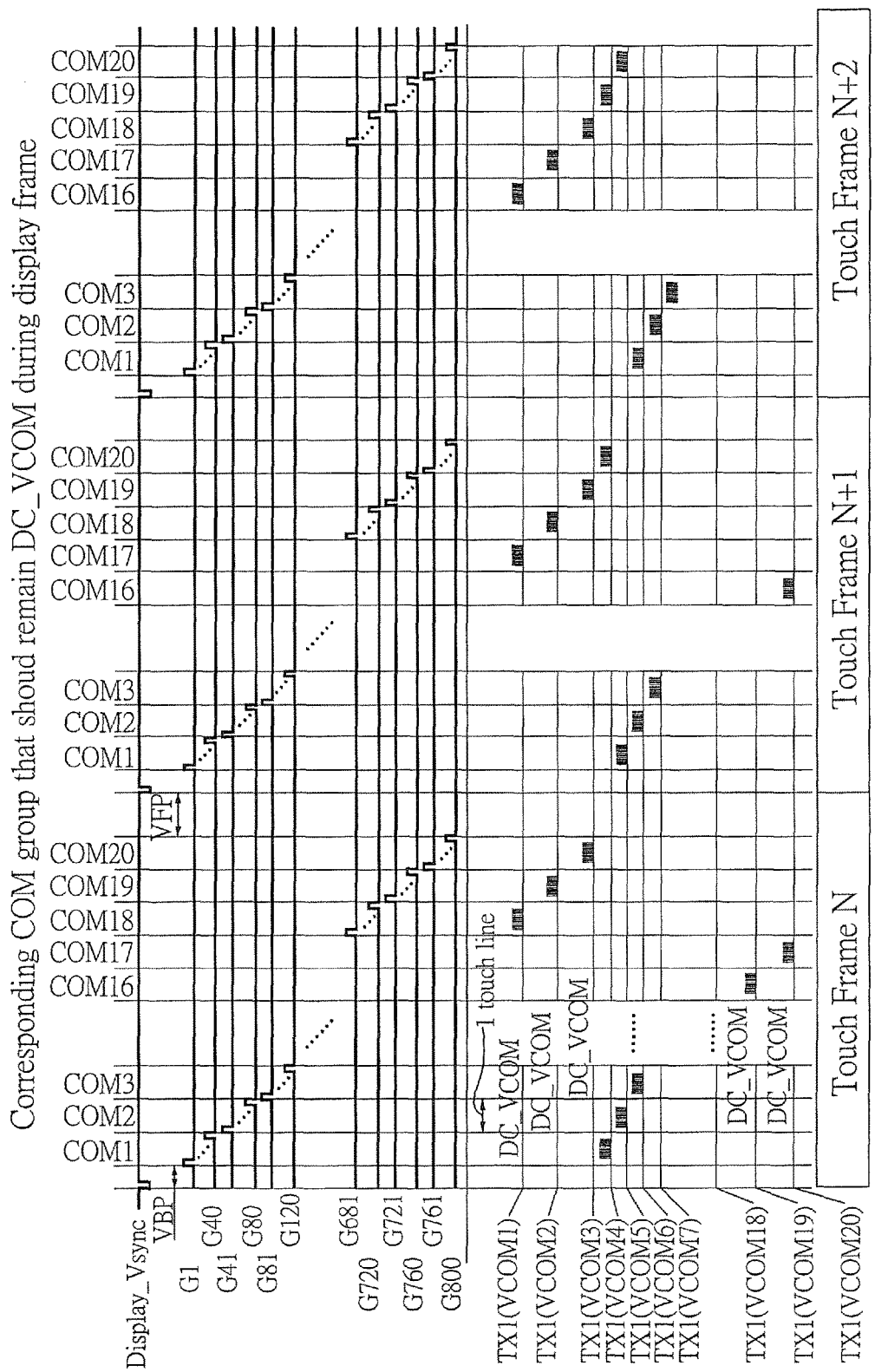
FIG. 4 schematically illustrates a control timing of using the touch controller to provide the touch driving signal to N touch driving lines according to the invention.

FIG. 4 schematically illustrates a control timing of using the touch controller 321 to provide the touch driving signal to N touch driving lines according to the invention. In a J-th display frame, the touch driving signal is sequentially provided, starting from an i-th touch driving line and, in a (J+1)-th display frame, the touch driving signal is sequentially provided, starting from an (i+1)-th touch driving line, where J and i are each a positive integer and i=2 to N.

As shown in FIG. 4, in the successive touch frames, the touch controller 321 provides the touch driving signal to the N touch driving lines in such a sequence that the position of the starting touch driving line (VCOM) is increased by one for every other touch frame. If a block of the gate lines G1-G4 is interfered by the touch frame N due to the operation of the touch driving line VCOM4, such interference occurs only in this touch frame. At the beginning of the next touch frame, the block activated by the gate lines G1-G40 is corresponding to the scanning period of the touch driving line VCOM5, but not the scanning period of the touch driving line VCOM4. Thus, the block of the gate lines G1-G4 may be interfered again by the touch driving line VCOM4 only after a few of the touch frames or a few tens of the touch frames. Further, the frame disturbance effect is reduced by the persistence of vision.

Figure 5:
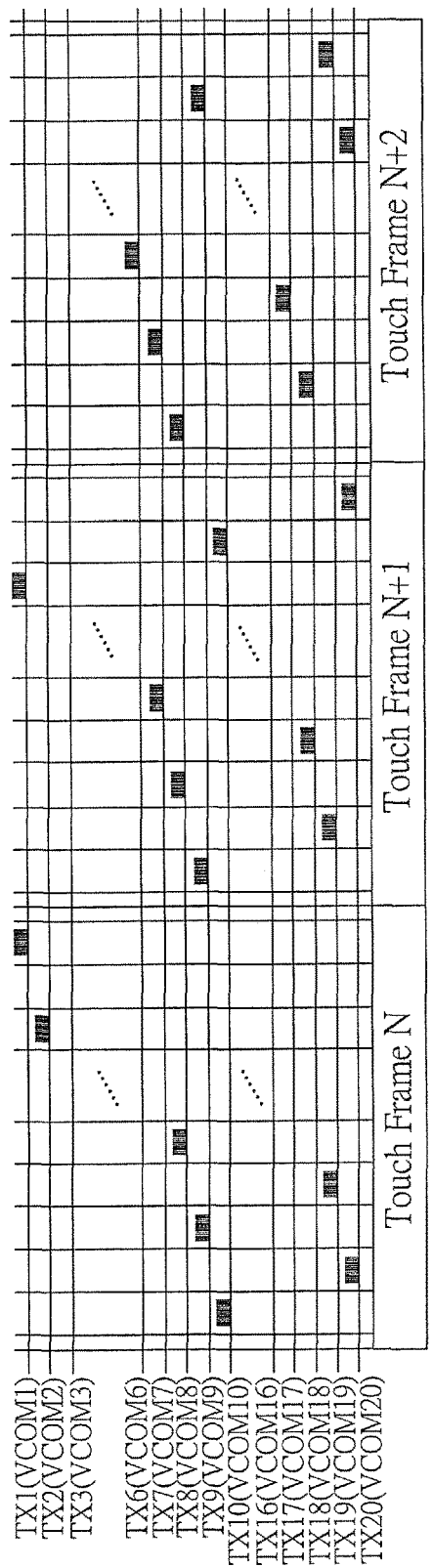
FIG. 5 schematically illustrates another control timing of using a touch controller to provide a touch driving signal to N touch driving lines according to the invention.

FIG. 5 schematically illustrates another control timing of using the touch controller 321 to provide the touch driving signal to the N touch driving lines according to the invention. In the J-th display frame, the touch driving signal is sequentially provided, starting from the i-th touch driving line wherein the value of i is generated by a random number generation function.

As shown in FIG. 5, which is a variation of the control timing of FIG. 4, the position of the starting touch driving line can be in any order, not necessary to sequentially increase with the increased touch frames. In this case, when the control timing of providing the touch driving signal to the N touch driving lines in a few of successive touch frames or a few tens of successive touch frames is different, the purpose of the present invention can be achieved.

Figure 6:
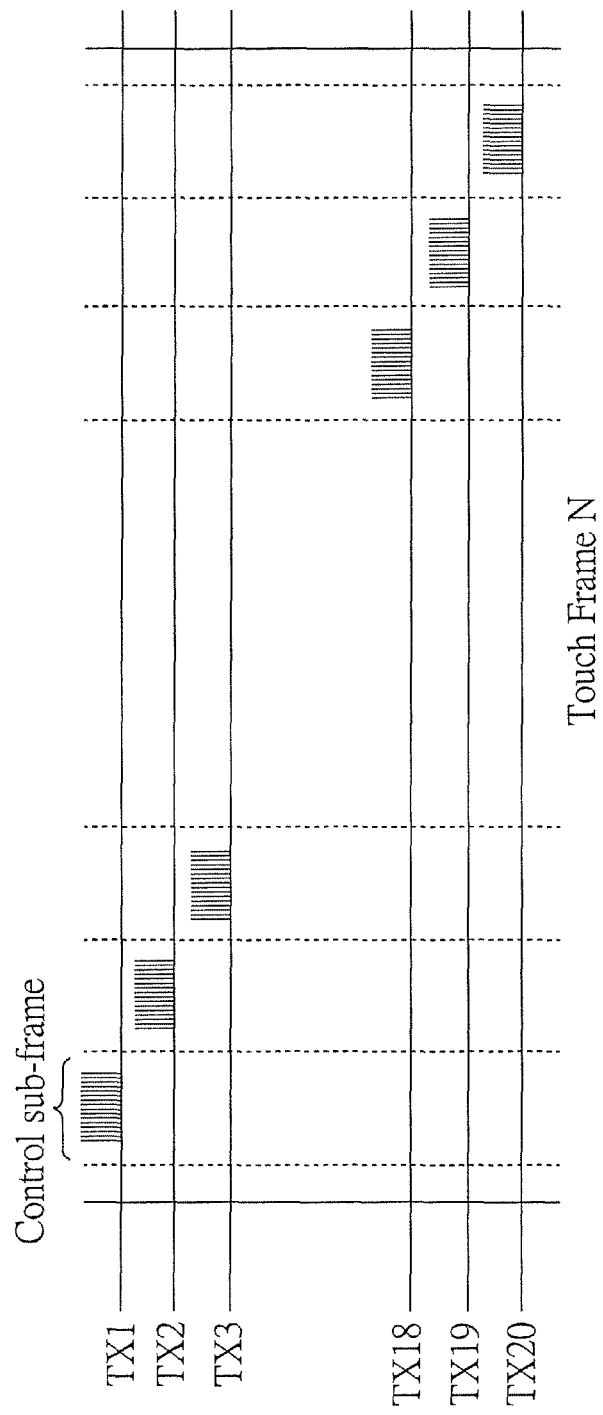
FIG. 6 schematically illustrates a control timing of typically using a touch controller to provide a touch driving signal to N touch driving lines in the prior art.

FIG. 6 schematically illustrates a control timing of typically using a touch controller to provide the touch driving signal to the N touch driving lines in the prior art. The touch driving signal is present only when the sensors work. This is because in one touch frame time, the touch driving signal above the N touch driving lines is instable, resulting in instable interference to the display.

Figure 7:
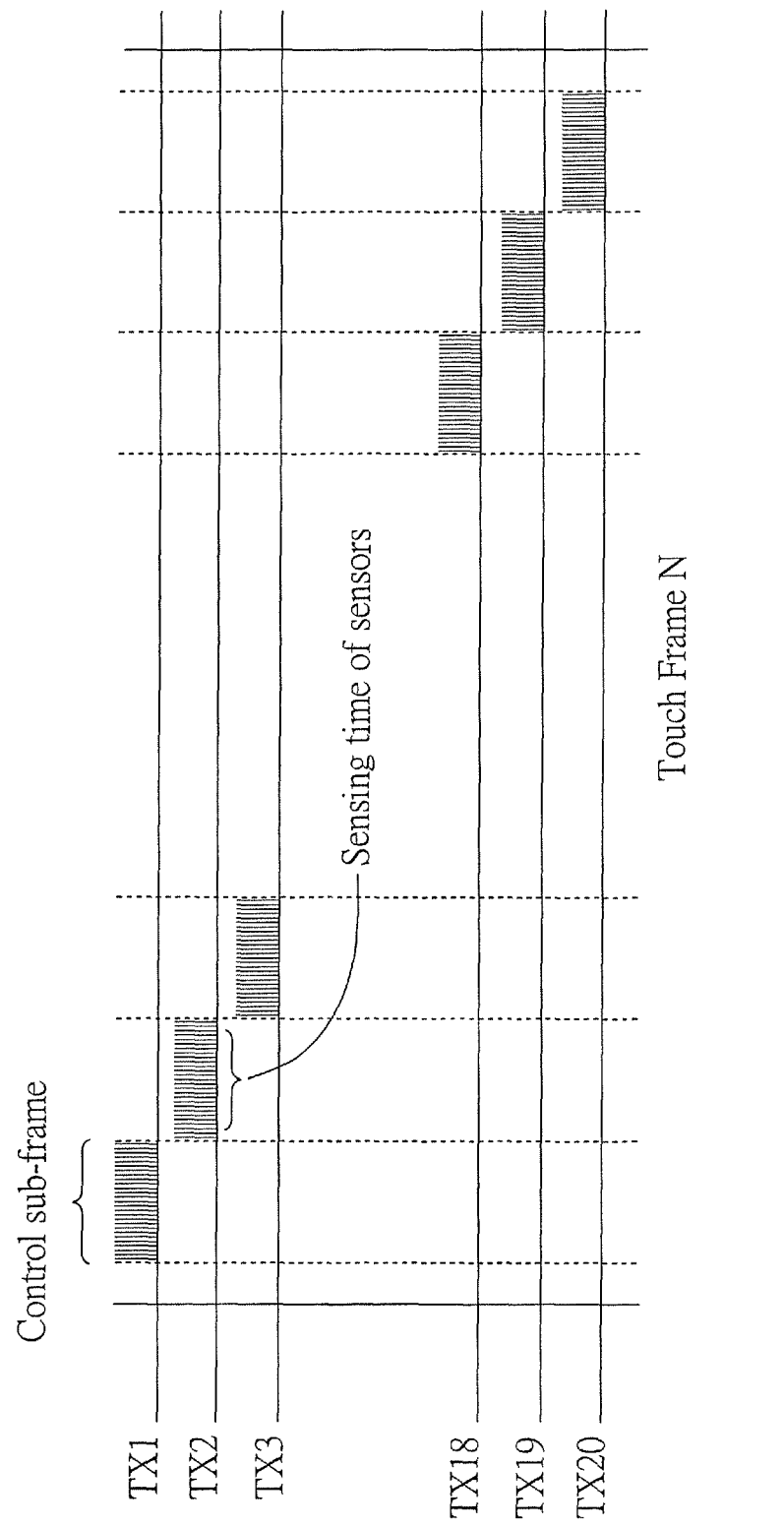
FIG. 7 schematically illustrates a further control timing of using a touch controller to provide a touch driving signal to N touch driving lines according to the invention.

FIG. 7 schematically illustrates a further control timing of using the touch controller 321 to provide the touch driving signal to the N touch driving lines according to the invention. In FIG. 7, the duration of a touch frame is divided into X touch sub-frames. In each touch sub-frame, the touch driving signal provided by the touch controller 321 is a pulse.

The pulse of the touch driving signal provided by the touch controller 321 can be shown as in FIG. 6, which does not fully occupy the touch sub-frame, or in FIG. 7, which fully occupies the touch sub-frame. That is, in FIG. 7, the driving scheme of the touch driving signal is improved to continuously output its pulse. Accordingly, the sensors can work normally because the pulse required for the sensors still exists in sensing. Further, even though the continuous provision of touch driving signal may cause interference to the display, such interference is uniformity so as to reduce the interference sensitivity in human eyes. Thus, a viewer is hard to perceive the interference.

Figure 8:
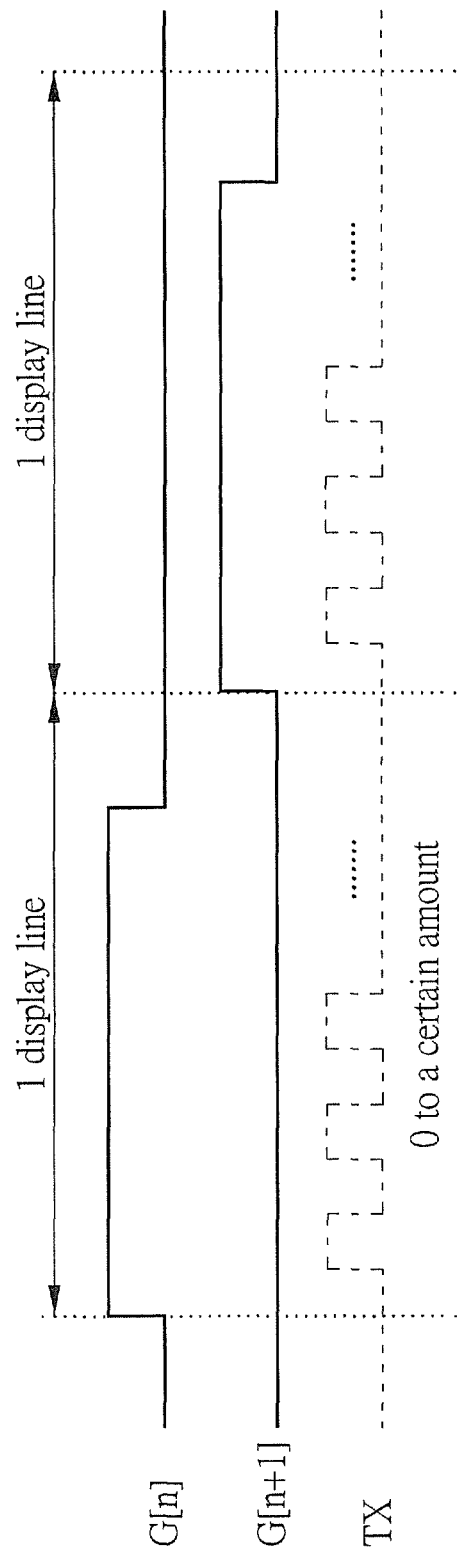
FIG. 8 schematically illustrates a further another control timing of using a touch controller to provide a touch driving signal to N touch driving lines according to the invention.

FIG. 8 schematically illustrates a further another control timing of using the touch controller 321 to provide the touch driving signal to the N touch driving lines according to the invention. In each activated gate line, the number of pulses of the touch driving signal ranges from zero to a certain amount.

Figure 9:
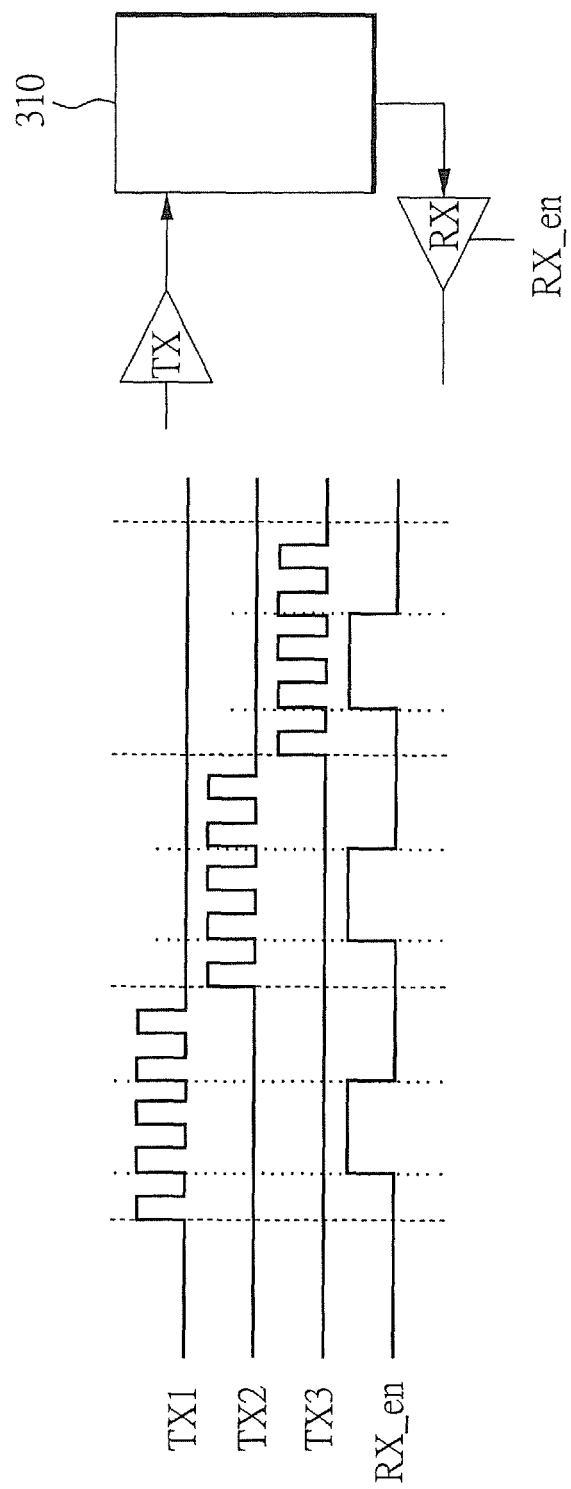
FIG. 9 schematically illustrates an operation according to the invention.

FIG. 9 schematically illustrates an operation according to the invention, which indicates that the sensors can be activated at any time. The touch controller 321 allows the pulse of the touch driving signal to be full of the touch sub-frame, and activates the sensors at any time. This is because the pulse of the touch driving signal required for the sensors still exists in sensing, so that touch sensing can be performed normally. Since the sensors can be activated at any time, it can avoid the touch driving signal from interfering in the pulse waveform so as to reduce the interference sensitivity in human eyes. Thus, a viewer is hard to perceive the interference.

As cited, the touch controller 321 provides the touch driving signal to the N touch driving lines with a different sequence in each touch frame of a few of or a few tens of successive touch frames. The timing that the touch controller 321 provides the touch driving signal to the N touch driving lines may be repeated with a cycle every a few of or a few tens of touch frames, rather than every frame. In each touch frame, the difference between the invention and the prior art is that the invention not only provides a pulse amount of the touch driving signal required for the sensors of the touch controller 321, as shown in the prior art, but also continuously provides the pulse in order to fully occupy the entire touch sub-frame to thus achieve the interference uniformity when the touch driving signal interferes with the panel 310. In addition, the invention implements the common voltage (com) layer and the touch driving layer (Tx) for touch sensing in FIG. 2(A) in the same layer for illustrative purpose only, while similar technique can be applied to FIGS. 2(B) and 2(C). Namely, the method cited in the invention can be used in a structure in which the touch driving layer (Tx) and common voltage (coin) layer do not share the same layer.

In summary, the present invention has the advantages as follows:

1. As shown in FIGS. 4, and 5, in a touch frame N, the touch controller 321 can provide the touch driving signal in any order or in sequence.

2. In a few of touch frames (Y, Y+1, ... , Y+Z), the touch controller 321 can provide the touch driving signal in various sequences, with a cycle every Z touch frames, where Z is a positive integer. In actual application, the various sequences can be generated by an adjustable lookup table.

3. The display frame and the touch frame can be synchronous or non-synchronous.

4. When the display frame and the touch frame are synchronous, the touch controller 321 does not provide the pulse of the touch driving signal within the active time of each gate line or provides one or more pulses of the touch driving signal. Namely, when some of the gate lines are activated, as shown in FIGS. 6-8, the touch controller 321 can output nothing or output one pulse or multiple pulses.

5. When the display frame and the touch frame are not synchronous, the touch controller 321 can arbitrarily output a required pulse amount of the touch driving signal, pause output, or output to fully occupy the touch sub-frame, wherein the power is saved when the output is paused.

6. The invention provides a manner which allows the touch driving signal to be full of the touch sub-frame and generates a corresponding active signal at the receiver RX of the touch controller 321 so as to receive touch signals. Since the sensors of the touch controller 321 can be activated at any time, it is able to block the noises caused by the panel 310, power supply, or any possible source that may affect the touch detection performance.

7. The invention is suitable for TFT, active-matrix organic light-emitting diode (AMOLD), in-cell display device, on-cell display device, and out-cell display device.

Although the present invention has been explained in relation to its preferred embodiment, it is to be understood that many other possible modifications and variations can be made without departing from the spirit and scope of the invention as hereinafter claimed.

What is claimed is:

1. A driving method for reducing display interference in an in-cell multi-touch panel having a thin film transistor (TFT) layer, a sensing electrode layer, and a common voltage and touch driving layer, wherein the TFT layer having K gate lines and L source lines, the sensing electrode layer having M sensing lines, the common voltage and touch driving layer having N touch driving lines, where K, L, N, M are positive integers respectively, the driving method comprising:

providing a display driving signal to the K gate lines and a display pixel signal to the L source lines so as to drive corresponding transistors and capacitors in a display frame for displaying an image; and providing a touch driving signal to the N touch driving lines and receiving touch signals from the M sensing lines so as to detect touch point positions of an external object in a touch frame, wherein the touch frame and the display frame are synchronous and have the same time width thereby being integrated as a touch display frame in which a first touch driving signal is provided substantially close to a first display driving signal and a last touch driving signal is substantially close to a last display driving signal, and sequence of providing the touch driving signal to the N touch driving lines in a J-th touch display frame is different from that in a (J+1)-th touch display frame;

wherein, in the J-th touch display frame, the touch driving signal is sequentially provided, starting from an i-th touch driving line and, in the (J+1)-th touch display frame, the touch driving signal is sequentially provided, starting from an (i+1)-th touch driving line, where J and i are positive integers respectively and i=2 to N.

2. The driving method as claimed in claim 1, wherein the touch frame includes X touch sub-frames, where X is a positive integer.

3. The driving method as claimed in claim 2, wherein the touch driving signal is a pulse respectively during the touch sub-frames.

4. The driving method as claimed in claim 3, wherein the pulse of the touch driving signal does not fully occupy the touch sub-frame.

5. The driving method as claimed in claim 3, wherein the pulse of the touch driving signal fully occupies the touch sub-frame.

6. The driving method as claimed in claim 2, wherein a number of the pulse of the touch driving signal ranges from zero to a certain amount when each of the gate lines is activated.

7. A system for reducing display interference in in-cell multi-touch panel, comprising:

a touch display panel, having a thin film transistor (TFT) layer, a sensing electrode layer, and a common voltage and touch driving layer, wherein the TFT layer having K gate lines and L source lines, the sensing electrode layer having M sensing lines to sense an approaching external object based on a touch driving signal, the common voltage and touch driving layer having N touch driving lines to receive a common voltage on displaying and to receive the touch driving signal on touch sensing, where K, L, M and N are positive integers respectively and K>N; and a touch display control subsystem, having a touch controller and a display driver such that the display driver provides a display driving signal to the K gate lines and a display pixel signal to the L source lines for driving corresponding transistors and capacitors in a display frame for displaying an image, and the touch controller provides a touch driving signal to the N touch driving lines and receives touch signals from the M sensing lines for detecting touch point positions of the approaching external object in a touch frame, wherein the touch frame and the display frame are synchronous and have the same time width thereby being integrated as a touch display frame in which a first touch driving signal is provided substantially close to a first display driving signal and a last touch driving signal is substantially close to a last display driving signal, and a sequence of providing the touch driving signal to the N touch driving lines in a J-th touch display frame is different from that in a (J+1)-th touch display frame;

wherein, in the J-th touch display frame, the touch driving signal is sequentially provided, starting from an i-th touch driving line and, in the (J+1)-th touch display frame, the touch driving signal is sequentially provided, starting from an (i+1)-th touch driving line, where J and i are positive integers and i=2 to N.

8. The system as claimed in claim 7, wherein the M sensing lines and the L source lines are disposed on a first direction, and the L gate lines and the N touch driving lines are disposed on a second direction.

9. The system as claimed in claim 8, wherein the first direction and the second direction are substantially vertical to each other.

10. A driving method for an in-cell multi-touch panel having a thin film transistor (TFT) layer, a sensing electrode layer, and a common voltage and touch driving layer, the TFT layer having K gate lines and L source lines, the sensing electrode layer having M sensing lines, the common voltage and touch driving layer having N touch driving lines, wherein K, L, N, M are each a positive integer, the driving method comprising:

providing a display driving signal to the K gate lines and a display pixel signal to the L source lines by an integrated touch display controller so as to drive corresponding transistors and capacitors in a display frame for displaying an image; and providing a touch driving signal to the N touch driving lines and receiving touch signals from the M sensing lines by the integrated touch display controller so as to detect touch point positions of an external object in a touch frame, wherein the touch frame and the display frame are synchronous and have the same time width thereby being integrated as a touch display frame in which a first touch driving signal is provided substantially close to a first display driving signal and a last touch driving signal is substantially close to a last display driving signal and, each touch display frame has different sequences of providing the touch driving signal to the N touch driving lines;

wherein, in a J-th touch display frame, the touch driving signal is sequentially provided, starting from an i-th touch driving line and, in a (J+1)-th touch display frame, the touch driving signal is sequentially provided, starting from an (i+1)-th touch driving line, where J and i are positive integers respectively and i=2 to N.

11. The driving method as claimed in claim 10, wherein the touch frame includes X touch sub-frames, where X is a positive integer.

12. The driving method as claimed in claim 11, wherein the touch driving signal is a pulse respectively during the touch sub-frames.

13. The driving method as claimed in claim 12, wherein the pulse of the touch driving signal does not fully occupy the touch sub-frame.

14. The driving method as claimed in claim 12, wherein the pulse of the touch driving signal fully occupies the touch sub-frame.

* * * * *